March 20, 1928. 1,663,465
J. A. NEFF
LUMINOUS FISHING TACKLE
Filed March 25, 1926
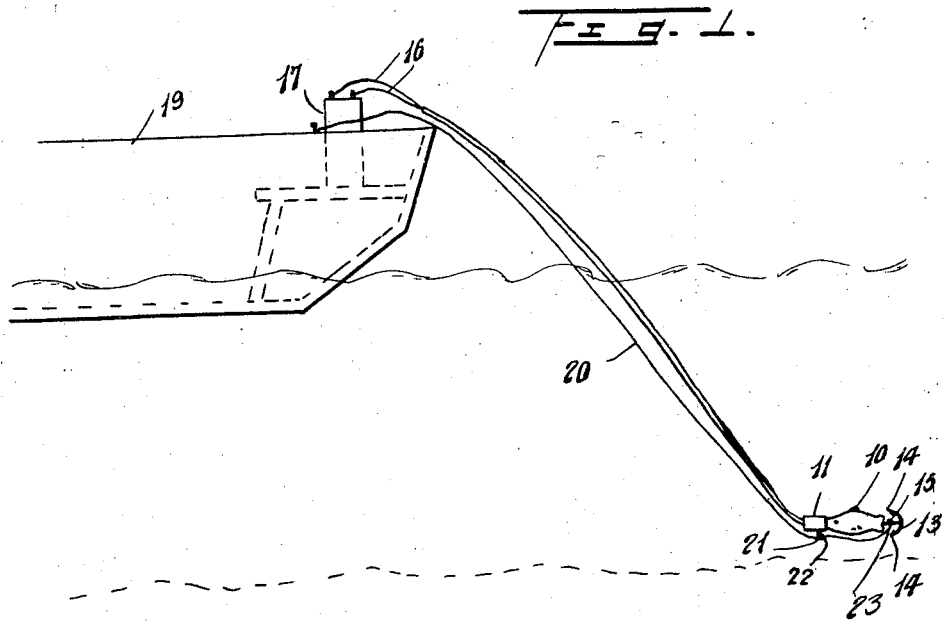
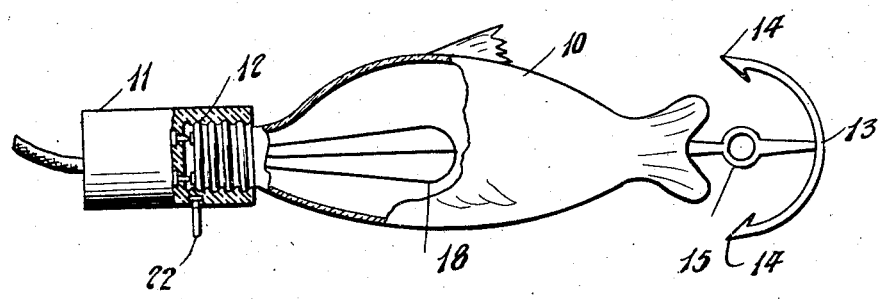
Inventor
J. A. Neff.
By
Attorney Patented Mar. 20, 1928.

1,663,465

UNITED STATES PATENT OFFICE.

JAMES A. NEFF, OF LAKEWOOD, OHIO.

LUMINOUS FISHING TACKLE.

Application filed March 25, 1926. Serial No. 97,295.

This invention relates to fishing tackle and particularly to artificial bait simulating a small fish and adapted to be illuminated in order to lure the fish.

It is aimed to provide a novel construction wherein a socket may be carried by the conductor wires to which the bait is fastened, which bait carries a hook or hooks, in combination with the fishing line which is fastened both to the socket and to the hook.

The primary aim is to produce tackle which will lure the fish by a dull luminous imitation fish or bait, so as to bite the hook.

Additional objects and advantages will become apparent from a consideration of the description following taken in connection with accompanying drawings illustrating an operative embodiment.

In said drawings:—

Figure 1 is a view illustrating the invention in elevation and in connection with a fragment of a boat, and Figure 2 is a plan view partly broken away, particularly illustrating the tackle.

Referring specifically to the drawings, a hollow body is provided at 10, which is preferably of glass, molded into the shape of a minnow or other small fish, and painted in natural colors with semi-opaque paint. This body 10 is therefore an electric bulb and it is detachably connected in a socket at 11, for instance by screw threads 12, although any other suitable form of fastening means may be substituted. At the tail, the body 10 carries a hook 13, which may be provided with one or any suitable number of prongs or hooks proper 14. The hook 13 has the shank thereof provided between its ends with an eyelet 15.

Two conductors 16 are connected to double contacts of the socket 11 with which double contacts of the bulb 10 engage. The conductors 16 may extend from an electric battery 17 which for example may be a one and one-half volt dry cell since it may be readily purchased in the market, is light in weight and inexpensive. The body or bulb 10 of course has a filament as at 18 whose ends engage the contacts or terminals which in turn abut the contacts or terminals of the socket and which have the wires or conductors 16 fastened thereto.

The battery 17 may be located in the boat or vessel 19 and as the conductors 16 extend into the water, they are heavily insulated.

The fishing line, which is also operated from the vessel 19, is shown at 20, is connected detachably at 21 to an eyelet 22 fixed to and projecting radially from the socket 11 and is detachably connected at 23 to the eyelet 15. As a result, the line is connected both to the socket and to the hook.

It will be realized that the bulb or body 10 and the hook 13 constitute a unit and are detachable from the socket when necessary for replacement or inspection.

In operation, body 10 while in the water will be illuminated by energy from the battery 17 passing through the conductors 16, and the contacts of socket 11, body 10 and the filament 18. The fish or body 10 will thus be illuminated and serve as a lure for the live fish. The hooks 14 may be baited as usual when fishing, and the movement of the device 10 and hook is controlled as usual by operation of line 20 as from within the vessel 19.

It is to be understood that the socket 11 is of a suitable waterproof type.

I claim as my invention:—

A bait of the character set forth, comprising a socket provided with contacts, conductors connected to the contacts for supplying current thereto, a bulb having one end thereof detachably engaged with the socket, said bulb being provided with a filament engaging the contacts, a hook having a shank secured directly to the other end of the bulb and provided between its ends with an eyelet, an eyelet fixed to and projecting radially from the socket, and a fishing line detachably connected to the eyelets.

In testimony whereof I affix my signature.

JAMES A. NEFF.